United States Patent
Strom et al.

(10) Patent No.: US 8,582,902 B2
(45) Date of Patent: Nov. 12, 2013

(54) PIXEL BLOCK PROCESSING

(75) Inventors: Jacob Strom, Stockholm (SE); Per Wennersten, Arsta (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 335 days.

(21) Appl. No.: 13/120,336

(22) PCT Filed: Nov. 18, 2008

(86) PCT No.: PCT/SE2008/051322
§ 371 (c)(1),
(2), (4) Date: Mar. 22, 2011

(87) PCT Pub. No.: WO2010/036166
PCT Pub. Date: Apr. 1, 2010

(65) Prior Publication Data
US 2011/0176739 A1    Jul. 21, 2011

Related U.S. Application Data

(60) Provisional application No. 61/099,281, filed on Sep. 23, 2008.

(51) Int. Cl.
*G06K 9/36* (2006.01)

(52) U.S. Cl.
USPC ........... 382/233; 382/239; 382/166; 348/239; 348/254

(58) Field of Classification Search
USPC ................ 382/233, 239, 241, 166, 232, 167; 348/239, 254, 362
See application file for complete search history.

(56) References Cited

U.S. PATENT DOCUMENTS

| | | | | |
|---|---|---|---|---|
| 6,301,389 B1* | 10/2001 | Penna et al. | .................. | 382/232 |
| 7,149,811 B2* | 12/2006 | Wise et al. | .................... | 709/247 |
| 7,693,337 B2* | 4/2010 | Strom et al. | .................. | 382/233 |
| 7,787,691 B2* | 8/2010 | Strom | .......................... | 382/166 |
| 2004/0156542 A1 | 8/2004 | Barone et al. | | |
| 2007/0019869 A1* | 1/2007 | Strom | .......................... | 382/233 |
| 2007/0127812 A1* | 6/2007 | Strom | .......................... | 382/166 |
| 2007/0237404 A1* | 10/2007 | Strom | .......................... | 382/232 |
| 2009/0092315 A1* | 4/2009 | Strom | .......................... | 382/166 |
| 2011/0176739 A1* | 7/2011 | Strom et al. | .................. | 382/233 |
| 2011/0235928 A1* | 9/2011 | Strom et al. | .................. | 382/233 |

FOREIGN PATENT DOCUMENTS

| WO | 99/18537 | 4/1999 |
| WO | 2008/027413 A2 | 3/2008 |

* cited by examiner

*Primary Examiner* — Mekonen Bekele
(74) *Attorney, Agent, or Firm* — Coats & Bennett, P.L.L.C.

(57) ABSTRACT

A compressed pixel block (400) is decompressed by defining multiple available property values. At least one reference point relative the pixel block (300) is identified based on a reference codeword (410) of the compressed pixel block (400). Pixel indices of the pixels (310) are determined based on the respective positions of pixels (310) in the pixel block (300) relative the at least one reference point. These pixel indices are used for selecting among the multiple defined property values. The selected property values are then assigned to pixels (310) to be decompressed based on their determined pixel indices.

16 Claims, 10 Drawing Sheets

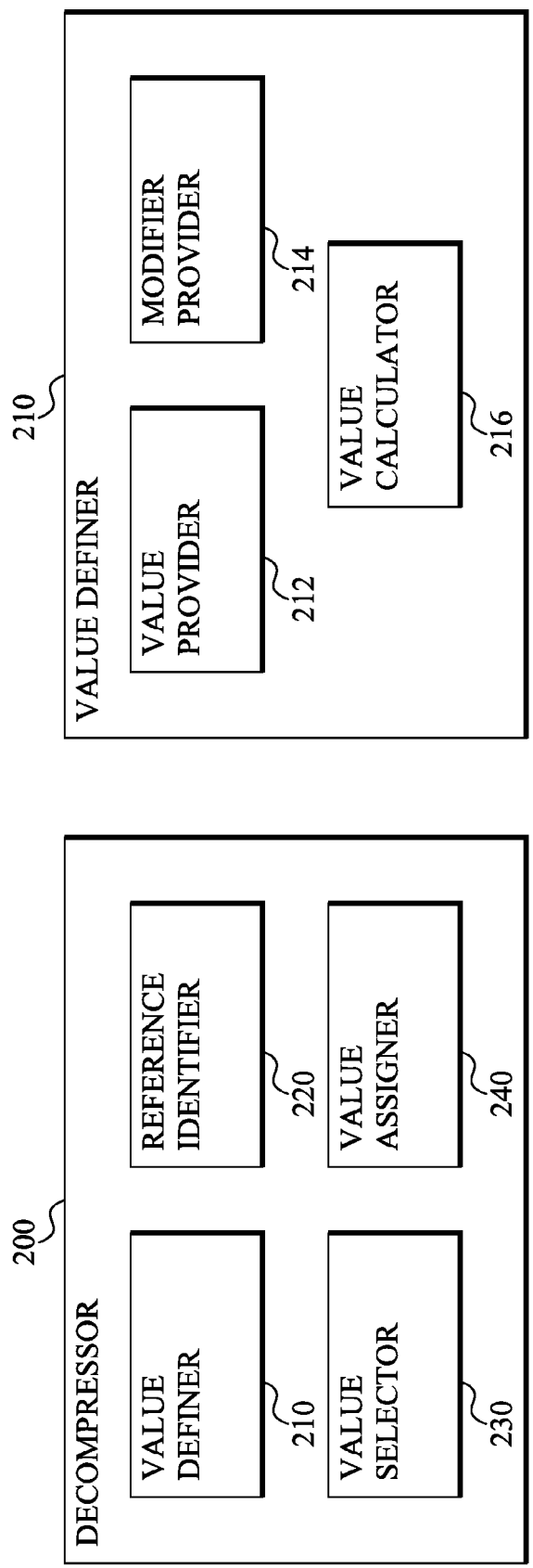

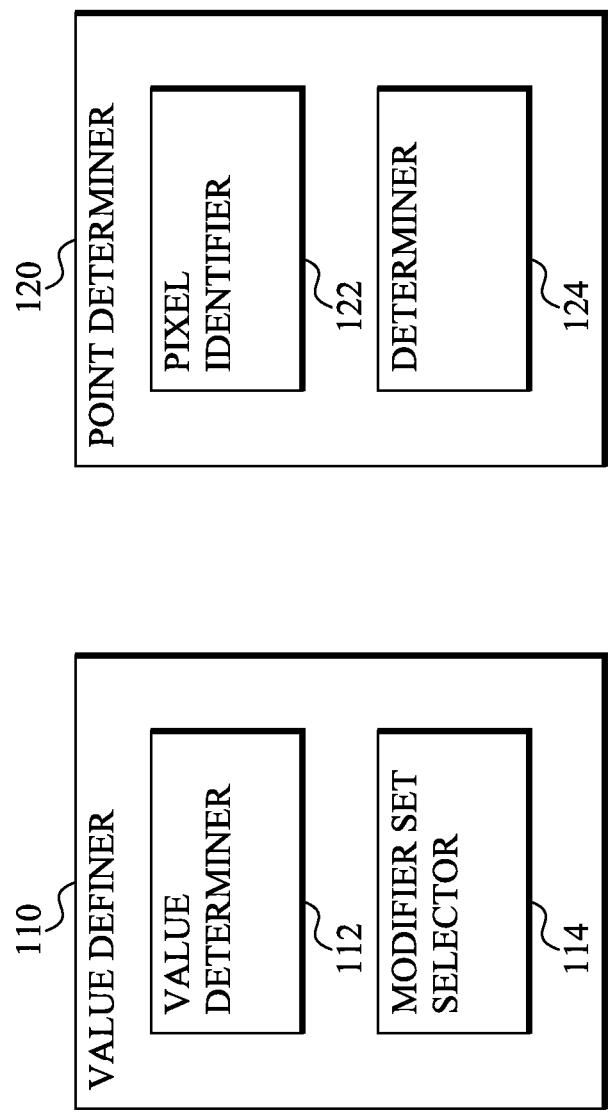

PIXEL BLOCK PROCESSING

TECHNICAL FIELD

The present invention generally relates to pixel block processing, and in particular to compression and decompression of pixel blocks.

BACKGROUND

When attempting to increase performance for graphics processing units (GPUs), one solution is to apply various techniques to reduce memory bandwidth consumption. Bandwidth reduction is also becoming increasingly important as the performance growth rate for processing power is much larger than performance growth rate for bandwidth and latency for random access memory (RAM).

Texture compression is one popular way of reducing bandwidth requirements. By storing textures in compressed form in memory and transferring blocks of the compressed data over the bus, the texture bandwidth is reduced substantially.

A texture is usually comprised of four channels: red, green, blue and alpha. The alpha channel was originally intended for storing opacity information, ranging from completely transparent to fully opaque. However, with the advent of pixel shaders, the alpha channel can now be used to store any type of information that can be useful during rendering alongside the normal color data. Examples of such information include material properties, such as specularity or shininess, and geometrical information, such as bump maps. It has also been more and more common to use textures containing only an alpha channel, i.e., without the red, green and blue channels, in order to store scalar data such as specular maps etc.

The current de-facto standard algorithms for alpha compression are the ones built into the DXTC/S3TC texture compression standard [1]. These algorithms contain two different alpha compression modes, both of which compress the alpha channel from the typical original size of eight bits per pixel down to four bits per pixel.

Thus, the quality of the DXTC-compressed alpha channels is very high. In some applications, using four bits per pixel, might be excessive. In contrast, the three color channels are compressed down to four bits per pixel combined, with a total of eight bits per pixel for compressed RGBA textures. The information contained in the alpha channel, thus, receives by far the highest quality of the four channels, even though the data stored therein generally requires less precision than the color of the texture.

SUMMARY

There is therefore a need for a texture compression and decompression scheme that allows efficient handling of alpha channels and achieves significantly higher compression ratios allowing saving bits that can be used for saving bandwidth or memory, or for boosting the color channels further.

It is a general objective to provide an efficient processing scheme that can compress and decompress textures.

This and other objectives are met by the embodiments as defined by the accompanying patent claims.

Briefly, the present embodiments involve compression and decompression of pixel blocks comprising pixels having associated property values. In the decompression, a compressed pixel block is processed in order to define multiple available pixel property values, preferably based on codeword data included in the compressed pixel block. A reference codeword comprised in the compressed pixel block is used for identifying at least one reference point relative the pixel block.

When a pixel is to be decoded or decompressed a pixel property value is selected for the pixel from the defined multiple property values. This value selection is, furthermore, performed based on the position of the pixel in the pixel block relative the at least one reference point. The selected pixel property value is assigned to the current pixel and used as the decoded representation of the original property value for the pixel.

In the compression, multiple pixel property values are defined for the pixel block, preferably based on at least a portion of the pixel property values in the pixel block. Furthermore, at least one reference point relative the pixel block is determined based on the pixel property values. This at least one reference point is used, during decompression as discussed above, for allowing identification of respective pixel property values among the defined property values for the pixels in the pixel block. A compressed representation of the pixel block is generated based on a representation of the determined reference point or points and preferably based on a representation of the defined property values.

The embodiments also relate to a compressor and decompressor.

The embodiments provide an efficient compression of the pixel property values by implicitly signaling pixel indices for selected property values through the positions of the pixels relative one or more reference points. This allows a higher compression ratio as compared to the prior art algorithms that uses an explicit signaling of pixel indices in the compressed pixel block.

Other advantages offered by the embodiments will be appreciated upon reading of the below description of the embodiments.

SHORT DESCRIPTION OF THE DRAWINGS

The embodiments together with further objects and advantages thereof, may best be understood by making reference to the following description taken together with the accompanying drawings, in which:

FIG. 8 is a schematic block diagram of a decompressor according to an embodiment;

FIG. 9 is a schematic block diagram of an embodiment of the value definer in the decompressor of FIG. 8;

FIG. 13 is a schematic block diagram of an embodiment of the value definer in the compressor of FIG. 12;

FIG. 14 is a schematic block diagram of an embodiment of the point determiner in the compressor of FIG. 12;

Figure 18:
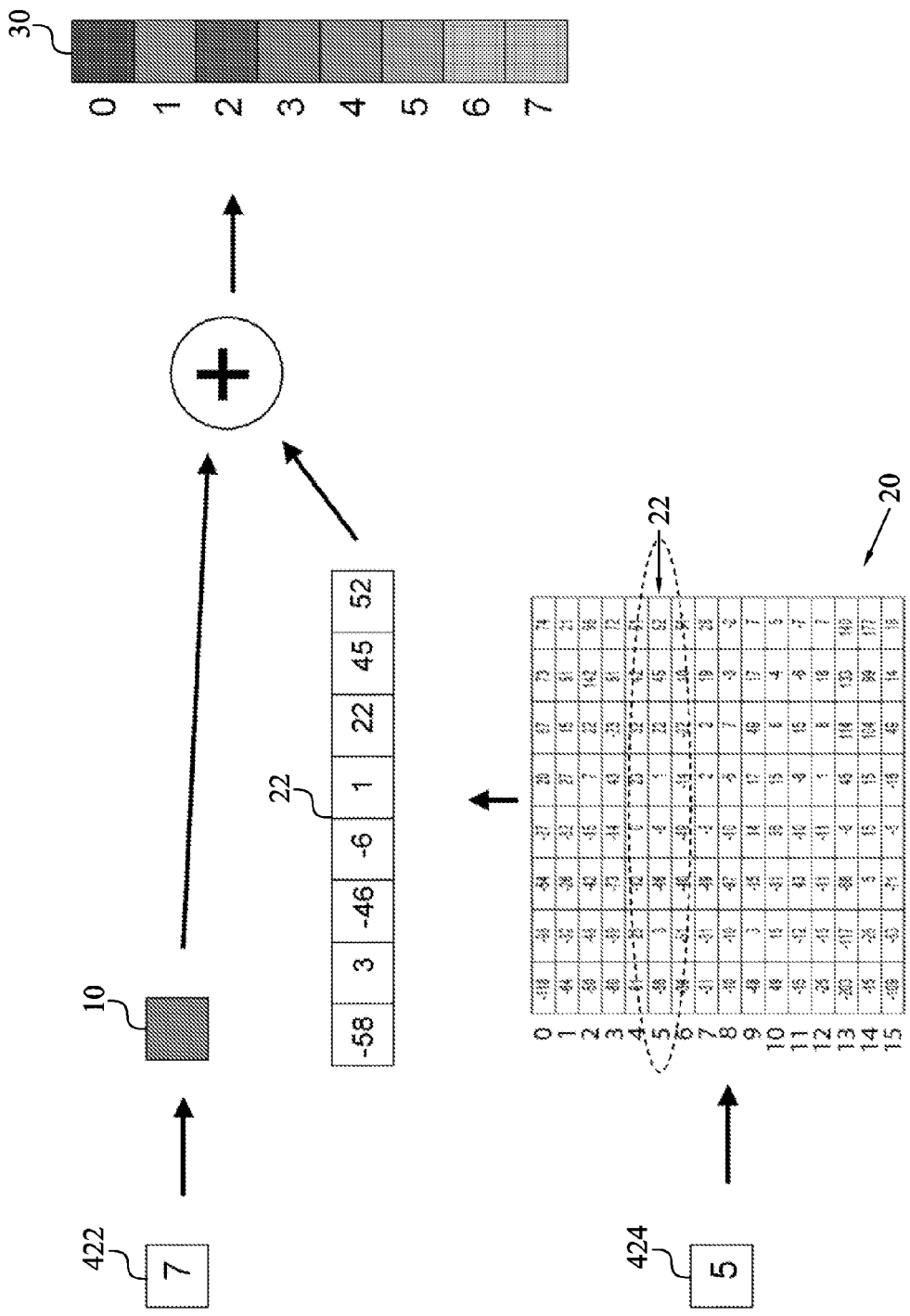
Figure 19:
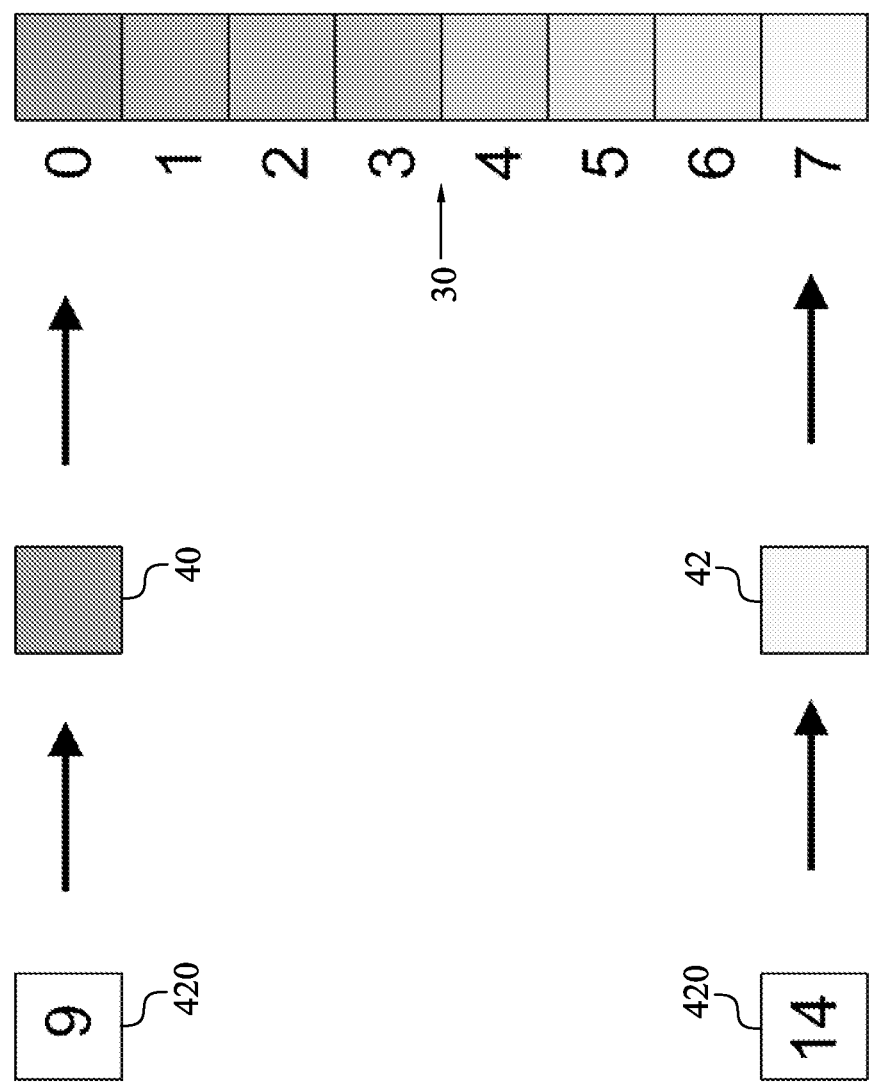
Figure 20:
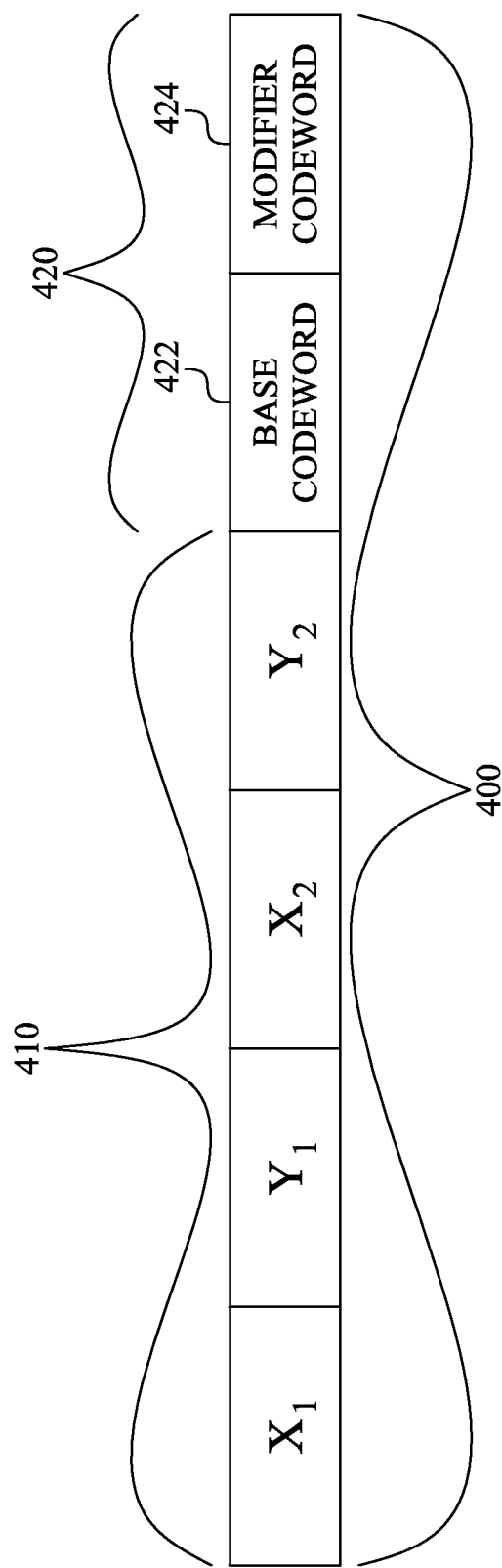

FIG. 18 schematically illustrates an embodiment of calculating a set of pixel property values from a base property value and a modifier set of modifier values;

FIG. 19 schematically illustrates an embodiment of calculating a set of pixel property values from two base property values; and FIG. 20 is a schematic illustration of a compressed pixel block according to an embodiment.

DETAILED DESCRIPTION

Throughout the drawings, the same reference characters will be used for corresponding or similar elements.

The present invention generally relates to compression and decompression of pixel property values, and in particular such a compression and decompression suitable for texture compression and decompression.

The present embodiments are well adapted for usage with three-dimensional (3D) graphics, such as games, 3D maps and scenes, 3D messages, e.g. animated messages, screen savers, man-machine interfaces (MMIs), etc., but is not limited thereto. Thus, the embodiments could also be employed for encoding other types of images or graphics, e.g. one-dimensional (1D), two-dimensional (2D) or 3D images.

In the present disclosure, the compression and decompression collectively handles a plurality of pixels, typically in the form of a block or a tile of pixels. In a preferred embodiment, such a pixel block has the size of M×N pixels, where M, N are integer numbers with the proviso that both M and N are not simultaneously one. Preferably, M=$2^m$ and N=$2^n$, where m, n are zero or integers with the proviso that m and n are not simultaneously zero. In a typical implementation M=N and preferred such pixel block embodiments could be 4×4 pixels, 8×8 pixels or 16×16 pixels.

The expression pixel or "block element" refers to an element in a pixel block or encoded representation of a pixel block. This pixel block, in turn, corresponds to a portion of an image or texture. Thus, a pixel could be a texel, i.e. texture element, of a 1D, 2D, 3D texture, a pixel of a 1D or 2D image or a voxel, i.e. volume element, of a 3D image. Generally, a pixel is characterized by an associated pixel parameter, or pixel property value or feature.

There are different such characteristic property values that can be assigned to pixels, typically dependent on what kind of pixel block to compress/decompress. For instance, the property value could be a color value assigned to the pixel. As is well known in the art, different color spaces are available and can be used for representing pixel color values. A usual such color space is the so-called red, green, blue (RGB) color space. A pixel property value could therefore be a red value, a green value or a blue value of an RGB color.

A pixel color can also be expressed in the form of luminance and chrominance components. In such a case, a transform can be used for converting a RGB color value into a luminance value and, typically, two chrominance components. Examples of luminance-chrominance spaces in the art include YUV, $YC_oC_g$ and $YC_rC_b$. A property value can therefore also be such a luminance value (Y) or a chrominance value (U, V, $C_o$, $C_g$, $C_r$ or $C_b$).

The present embodiments are advantageously used for handling the pixel property values contained by the alpha channel used separately or together with the RGB color data when the textures and the pixels therein are in the RGBA format. The alpha channel may in turn define vastly different pixel characteristics, such as opacity data, material property data, specularity, shininess, geometrical data, bump map or depth data, specular map data, etc. Thus, a property value denotes any property or characteristic associated with or that can be handled with pixels of a pixel block, i.e. tile. Note, however, that the embodiments are not necessarily limited to usage for compressing and decompressing pixel property values carried in the alpha channel of RGBA textures. In clear contrast, the embodiments can be used as stand alone tool for processing any prior known pixel property value or be used as a complement to any other compression/decompression algorithms that then handles other pixel property data associated with the pixels.

Thus, the embodiments disclosed herein can be used to, for instance, compress and decompress alpha channel data, RGB data and RGBA data. In the latter, the alpha channel data can be processed as disclosed herein, while any prior art compression/decompression scheme can be used for handling the RGB data.

Furthermore, in the following, the term "image" is used to denote any 1D, 2D or 3D image or texture that can be encoded and decoded by means of the present embodiments, including but not limited to bump maps, normal maps, photos, game type textures, text, drawings, high dynamic range images and textures, etc.

The present invention provides a novel approach to image and texture compression by providing an implicit signaling of pixel indices instead of using explicit signaling of such pixel indices in the compressed pixel block. This achieves a much more compact encoding or can be used for spending more bits on other characteristics included in the compressed pixel block.

Decompression

Figure 1:
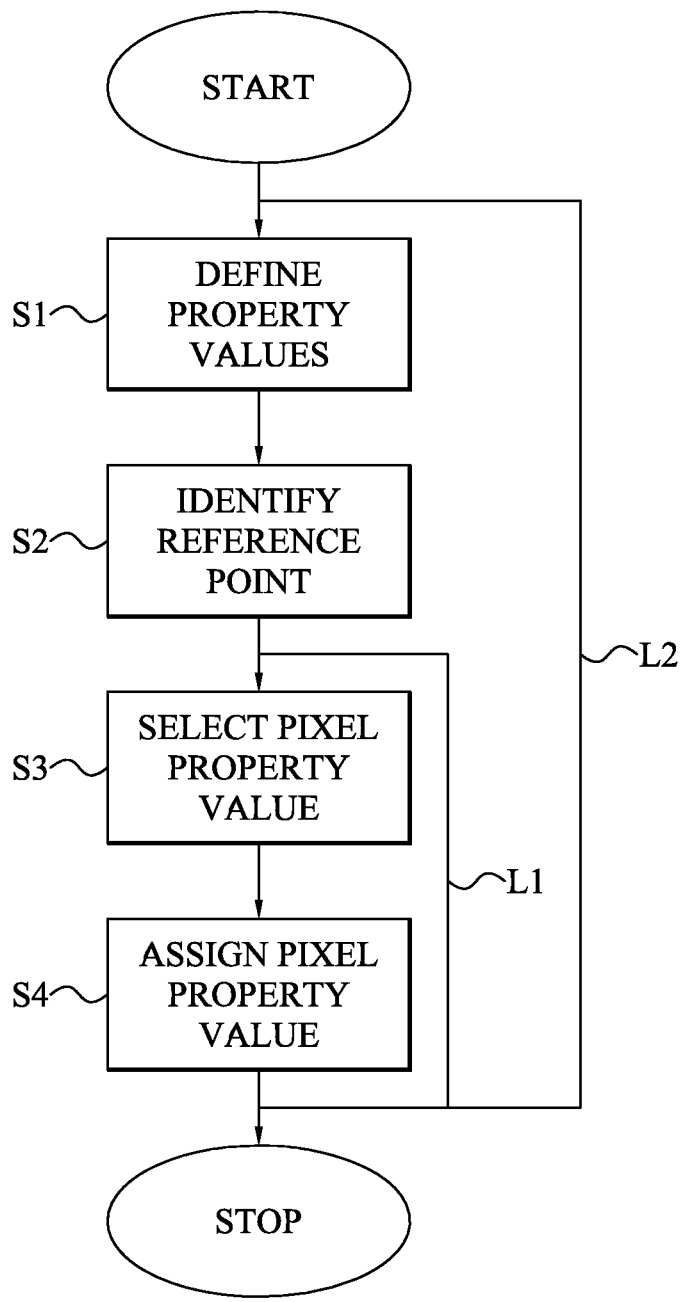
FIG. 1 is a flow diagram illustrating a method of decompressing a compressed pixel block according to an embodiment.

FIG. 1 is a flow diagram illustrating a method of decompressing a compressed pixel block in order to get a decompressed representation the original property value of at least one pixel in the pixel block.

The method generally starts by identifying a compressed pixel block to decode/decompress. It could be possible that all compressed pixel blocks of an encoded image or texture should be decoded to generate a decoded representation of the original texture. Alternatively, only a portion of the texture is to be accessed. As a consequence, only a selected number of pixel blocks have to be decompressed or more precisely, a selected number of pixels of certain pixel blocks have to be decoded.

The method starts in step S1, where multiple allowable pixel property values are defined for the current pixel block. In a first embodiment, these multiple property values can take any value or at least any value representable with a limited bit resolution within a defined interval, such as [0.0, 1.0]. In a second embodiment, these multiple property values together define a property value set of multiple property values, such as ranging from property value $000_{bin}$ to $111_{bin}$ in the case of eight different property values. However, in a preferred embodiment, the defining step S1 involves providing a property value set based on information, i.e. a set codeword, included in the compressed pixel block, which is further discussed herein.

A next step S2 identifies at least one reference point relative the pixel block. This point identification is performed based on a reference codeword comprised in the compressed pixel block. In a typical embodiment, step S2 identifies one or more reference points as coinciding with one or more pixel positions in the pixel block, preferably the center position of the at least one pixel. In such a case, the pixel block can be regarded as being placed in a coordinate system with the origin of coordinates having a predefined position relative the pixel block. Typically, the origin coincides with the upper left pixel position in the pixel block that then has the coordinates (x, y)=0, 0), where x denotes the column coordinate or number in the pixel block and y is the corresponding row coordinate or number. Even though a positioning of the at least one reference point as a coordinate inside the pixel block is preferred, at least one of the reference points may indeed be positioned outside the boundary of the current pixel block in the coordinate system.

Figure 15:
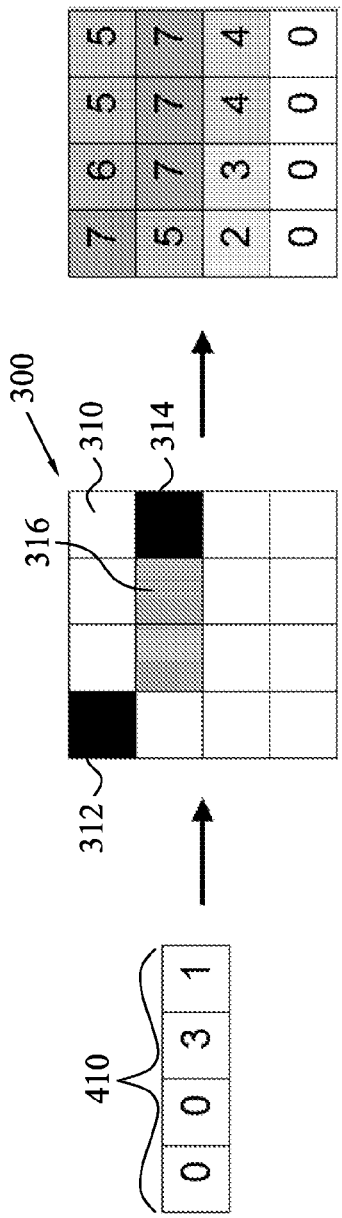
FIGS. 15-17 illustrate different embodiments of defining reference points and implicitly determining value indices for pixels.
Figure 16:
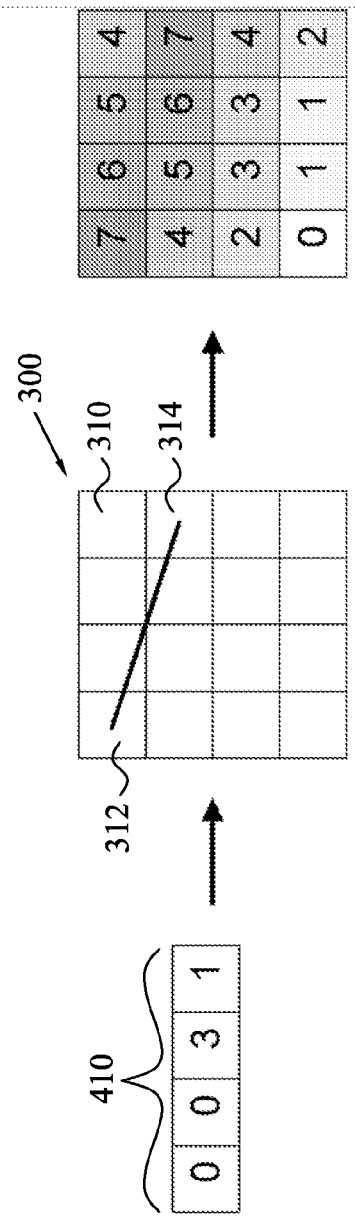

In an optional embodiment, the reference codeword defines one or multiple reference points relative the pixel block. At least one further reference point can then be identified in step S2 based on the defined one or multiple reference points. This situation is schematically illustrated in FIGS. 15 and 16. In the left portion of the figures, the reference codeword 410 is schematically illustrated as including the coordinates of two pixel positions in the pixel block 300, i.e. (0, 0) and (3, 1) in this illustrative example. In FIG. 15, the two reference points/pixels 312, 314 having these coordinates are marked in black in the pixel block 300. In addition, in this embodiment further reference points are identified as intermediate pixels 316 lying on the path when traveling from one of the reference points to the other. In the present example, two such intermediate reference points/pixels 316 are indicated with hatching in FIG. 15.

FIG. 16 illustrates an alternative approach of providing further reference points. In this case, a line interconnecting the two reference point coordinates of the reference codeword 410 is illustrated in the pixel block 300. Any point on this line or curve can then be regarded as an identified reference point in step S2.

Figure 17:
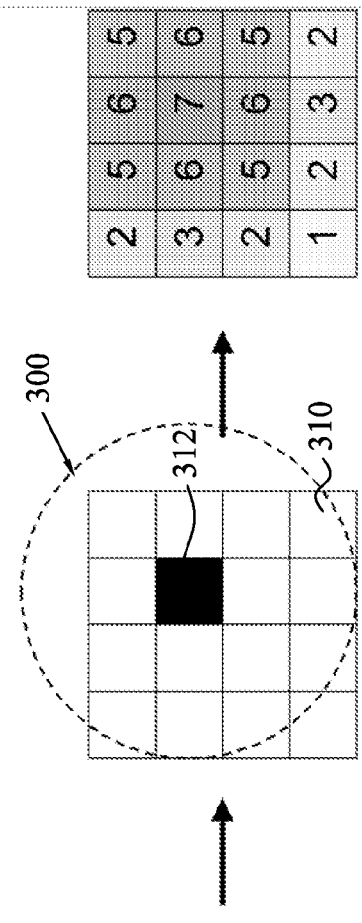

In the examples of FIGS. 15 and 16, multiple reference points are identified in step S2. FIG. 17 illustrates an alternative approach, where only a single reference point/pixel 312 is identified based on the reference codeword 410. The steps S1 and S2 can be performed serially as illustrated in FIG. 1 with step S1 preceding step S2. Alternatively, step S2 can be performed prior to step S1 or indeed the two steps S1 and S2 can be performed in parallel. The following two steps S3 and S4 are performed for each pixel that should be decoded in the pixel block.

Step S3 selects a pixel property value among the multiple property values defined in step S1 for a pixel to be decoded. Furthermore, this value selection is performed based on the position of the pixel in the pixel block relative the position of at least one of the reference points identified in step S2. Thus, the relative position of the pixel in relation to one or more of the reference points determines which of the allowable property values from step S1 that is selected for the pixel. As a consequence, no explicit pixel index assigned to the pixel in the compressed pixel block and indicating one of the allowable property values is needed for the pixel.

The value selection of step S3 can be performed according to different embodiments as is further discussed herein, e.g. based on the number of neighboring reference points that are adjacent to the current pixel in the pixel block, the distance from the current pixel to the closest reference point, etc.

The final step S4 assigns the selected property value from step S3 to the current pixel to be decoded. This assigned property value is therefore used as decompressed or decoded representation of the original property value of the pixel.

Steps S3 and S4 could be performed for several pixels in the pixel block as is schematically illustrated by line L1. It is anticipated that in some applications, only a single pixel is decoded from a pixel block, whereas in other applications multiple pixels of a pixel block are decoded and/or all the pixels of a pixel block are decoded.

Steps S1 to S4 are preferably repeated for all pixel blocks that comprise pixels that should be decoded as is schematically illustrated by line L2. This means that the loop of steps S1 to S4 could be performed once, but most often several times for different compressed pixel blocks and/or several times for a specific compressed pixel block.

A decoded representation of the original image/texture, or a portion thereof, can then be generated based on the decoded pixels and pixel blocks. Note that in some applications, several pixels have to be decoded in order to render a single pixel of the decoded representation. For example, during trilinear interpolation, eight neighboring pixels are decoded and for bilinear interpolation the corresponding number is four pixels, which is well known to the person skilled in the art. The method then ends.

Figures 2, 3, 4:
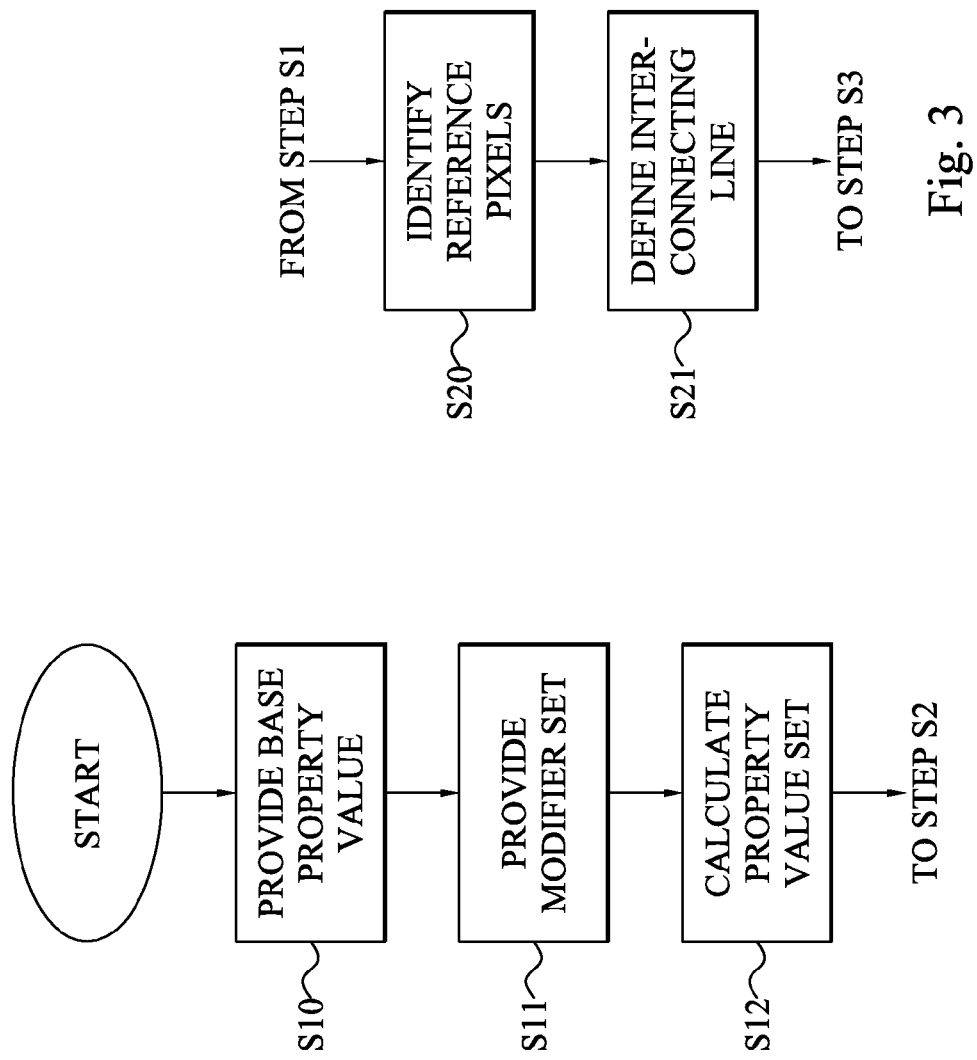
FIG. 2 is a flow diagram illustrating an embodiment of the value defining step of the decompression method in FIG. 1.
FIG. 3 is a flow diagram illustrating an embodiment of the identifying step of the decompression method in FIG. 1.
FIG. 4 is a flow diagram illustrating an additional, optional step of the decompression method in FIG. 1.

FIG. 2 is a flow diagram illustrating a particular embodiment of the value defining step of FIG. 1. In this embodiment, a property value set of multiple pixel property values is provided based on a set codeword included in the compressed pixel block. Furthermore, this set codeword preferably comprises a base codeword and a modifier codeword.

The method starts in step S10, which provides a base property value for the current pixel block. This base property value is furthermore provided based on the base codeword included in the compressed pixel block. Thus, the base codeword is an encoded representation of the relevant base property value. In an embodiment, the base codeword is an unquantized version of the base property value, implying that the bit sequence of the base codeword is simply fetched from the compressed pixel block and used directly as base property value for the pixel block. In another embodiment, the base codeword is a quantized version of the base property value. In such a case, the quantized value must first be dequantized to get the base property value. Several different quantizing-dequantizing techniques are known in the art and can be used on the information. An illustrative example is to use a B-bit base codeword that is expanded into a 2B-bit base property value, for instance by re-using the same B-bit sequence as the B most significant and B least significant bits of the 2B-bit base property value.

Step S11 provides a modifier set of multiple value modifiers that are applicable to the base property value. This modifier set is provided in step S11 based on a modifier codeword included in the compressed pixel block. In a first embodiment, the modifier codeword comprises quantized or unquantized versions of the multiple value modifiers. However, in order to reduce the bit length of the modifier codeword, it would be more efficient if the modifier codeword only comprises a subset of the multiple value modifiers. The remaining value modifiers of the modifier set can then be calculated from this subset of value modifiers. For instance, the subset can include positive or negative value modifiers. In such a case, negative or positive counterparts can be calculated by negating the value modifiers in the subset. In addition, or alternatively, further value modifiers can be calculated by multiplying a value modifier from the subset with one or more predefined factors to get one or more further value modifiers.

A further embodiment uses a table containing multiple modifier sets. In such a case, each set in the table is associated with a set index. The modifier codeword in the compressed pixel block is therefore used as set index to identify and provide one of the modifier sets from the table.

The multiple allowable pixel property values are calculated in step S12 based on the base property value from step S10 and the value modifiers from step S11. In a preferred embodiment, the different value modifiers of the modifier set are added to the base property value in order to get the property value set. This could be implemented as a simple addition of the value modifiers to the base property value. In an alternative embodiment, another type of modification than an addition could be employed, e.g. multiplication, XOR or another arithmetic operation.

In the case that property values are only allowed to be within a predefined interval, the resulting property values are clamped between a minimum threshold and a maximum threshold. For example, if after adding the value modifier to the base property value, the resulting property value is smaller than the minimum threshold, the property value is clamped to the value of this minimum threshold. Correspondingly, if the resulting property value is larger than the maximum threshold, the value of the maximum threshold should instead be used as property value. A non-limiting example of a minimum and maximum threshold is 0 and 255, respectively, for the case with 256 different pixel property values.

FIG. 18 is a schematic illustration of this embodiment in providing pixel property values. In the upper portion of the figure, the base codeword 422 is schematically illustrated as representing a quantized value of $0111_{bin}=7$ resulting in a base property value 10 of $01110111_{bin}=119$ after dequantization. The modifier codeword 424 has the value $0101_{bin}=5$. The figure also illustrates a non-limiting example of a table 20 with multiple, in this case 16, modifier sets 22. The modifier codeword 424 is used for retrieving the correct modifier set 22 having, in this example, the value modifiers [−58, 3, −46, −6, 1, 22, 45, 52]. These value modifiers are added to the base property value 10, e.g. 119, to get the final property value set 30 illustrated on the right hand side of the figure in the form of their resulting alpha values, which is indicated as different shades of gray.

A non-limiting example of a table with multiple modifier sets that can be used according to the embodiments is the table presented in FIG. 18 and below as Table I.

TABLE I table of modifier sets

| Modifier set | Value modifiers | | | | | | | |
|---|---|---|---|---|---|---|---|---|
| 0 | −118 | −98 | −54 | −27 | 20 | 67 | 73 | 74 |
| 1 | −64 | −32 | −26 | −32 | 27 | 15 | 51 | 21 |
| 2 | −50 | −48 | −42 | −15 | 7 | 22 | 142 | 96 |
| 3 | −80 | −69 | −73 | −14 | 43 | −23 | 51 | 72 |
| 4 | 61 | 25 | −12 | 0 | 23 | 32 | 42 | 51 |
| 5 | −58 | 3 | −46 | −6 | 1 | 22 | 45 | 52 |
| 6 | −38 | −51 | −40 | −49 | −14 | −22 | 10 | 54 |
| 7 | −31 | −31 | −49 | −3 | 2 | 2 | 19 | 28 |
| 8 | −10 | −10 | −97 | −10 | −5 | 7 | −3 | −2 |
| 9 | −48 | 3 | −15 | 14 | 17 | 49 | 17 | 7 |
| 10 | 49 | 15 | −31 | 36 | 15 | 6 | −4 | 5 |
| 11 | −15 | −12 | 43 | −10 | −8 | 15 | −6 | −7 |
| 12 | −25 | −15 | −11 | −11 | 1 | 8 | 18 | 7 |
| 13 | −203 | −117 | −68 | −8 | 45 | 114 | 133 | 140 |
| 14 | −15 | −26 | 5 | 15 | 15 | 104 | 99 | 177 |
| 15 | −109 | −63 | −71 | −5 | −16 | 49 | 14 | 18 |

The actual value modifiers in the table depend at least to some extent on the type of property values of the pixels in the pixel blocks. A suitable table of modifier sets as the one in Table I can be determined in an optimization procedure where different modifier sets are tested for different test pixel block with the purpose of compressing and decompressing the test pixel blocks with as high accuracy in terms of peak signal to noise ratio (PSNR) as possible.

FIG. 19 illustrates an alternative embodiment of providing a property value set 30. In this embodiment, the set codeword 420 comprises a representation of a first quantized property value, such as $1001_{bin}=9$, and a representation of a second quantized property value, such as $1110_{bin}=14$. These property values are preferably in quantized forms and are first dequantized to get the final pixel property values 40, 42 of $10011001_{bin}=153$ and $11101110_{bin}=238$. The remaining pixel property values of the property value set are calculated as different weighted, preferably linear, combinations of these two property values 40, 42. Preferably, the remaining property values are intermediate property values calculated as $$\frac{(R-1-j)A + jB}{R-1},$$

where A represents the first pixel property value 40, such as 153, B represents the second pixel property value 42, such as 238, R represents the total number of property values in the property value set, such as 8, and $j \in [0, R-1]$.

This embodiment is particularly suitable for handling RGB-data.

FIG. 3 is a flow diagram illustrating an embodiment of the identifying step of FIG. 1. The method continues from step S1 of FIG. 1. A next step S20 identifies a first reference pixel and a second reference pixel in the pixel block based on the reference codeword. Thus, the reference codeword comprises the coordinates of these two pixels as illustrated in FIGS. 15 and 16. A next step S21 defines a line in the pixel block 300 extending from the first reference pixel 312 to the second reference pixel 314. In a first embodiment, the reference points include the positions of the first and second reference pixels 312, 314 and the positions of any intermediate pixels 316 in the pixel block 300 lying on the line. This is illustrated in FIG. 15.

In the embodiment of FIG. 15, a line, one pixel wide, is drawn between the two reference pixels 312, 314, and all pixels 316 on the line are regarded as reference points. The method used for drawing the line can be very simple. Starting from the first pixel 312, one moves in steps towards the second pixel 314, each step moving the horizontal and vertical coordinate one pixel length closer to the endpoint, unless the coordinate is already the same. All pixels 316 along the way are marked with hatching in FIG. 15, and one stops once the endpoint has been reached. In principle, any line-drawing algorithm, such as the Bresenham algorithm, can be used instead, as long as the same algorithm is used for compression and decompression.

FIG. 16 has taken an alternative approach by instead drawing a straight interconnecting line between the reference points or pixels 312, 314. Any point on this line is regarded as reference point in this embodiment.

The method then continues to step S3 of FIG. 1.

One or more positions of the reference points can be dedicated for special pixel blocks. For instance, if all pixels in the pixel block have at least substantially the same property value, a good representation of the pixel block would be to determine the base property value to be a representation of this property value and use this base property value for all pixels in the pixel block. A given combination of coordinates for the two reference points can signal such a special case.

Then, no modifier sets need to be provided and the modifier codeword can therefore have an arbitrary value. Alternatively, if the reference codeword indicates this particular combination of coordinates, the code for both the base codeword and the modifier codeword could be used for representing the base property value. This means that the base property value can be represented at higher precision in these special cases.

Another special case could be when the two reference points have the same coordinate and position in the pixel block. In such case, those pixel blocks can be handled according to a separate mode. For instance, the modifier sets available could be a subset of the modifier sets in the table or use other modifier sets that are not available when having two different reference points.

If the reference codeword indicates two coordinates of two reference pixels or points and any further, intermediate, reference point is present on an interconnecting line or is present on the path between the two reference pixels or points, a further special case may arise. Thus, assume that the first reference pixel or point has the coordinate $(\alpha, \beta)$ and the second reference pixel or point has the coordinate $(\chi, \delta)$. Such a pixel block will have the same distribution of assigned pixel property values as a pixel block, where the first reference pixel or point has the coordinate $(\chi, \delta)$ and the second reference pixel or point has the coordinate $(\alpha, \beta)$ if the base codeword and the modifier codeword are the same for the two pixel blocks. Thus, the results will be the same if the positions of the first and second reference pixels or points are swapped. This can be exploited to signal two different modes. For instance, in the first mode, a predefined table of modifier sets is used, such as illustrated in FIG. 18. In the second mode, the order of the value modifiers in the modifier sets can be reversed. This basically corresponds to reversing the order of the property value set provided for the pixels in the second mode as compared to the first mode. An alternative variant of the second mode is to swap the signs of the value modifiers in the different modifier sets in the predefined table as compared to the value modifiers used in the first mode.

FIG. 4 is a flow diagram illustrating an additional, optional step of the decompression method according to an embodiment. The method continues from step S2 of FIG. 1. A next step S30 counts, for a given pixel to be decoded, the number of neighboring pixels in the pixel block relative the pixel which are regarded as reference points. The method then continues to step S3, where this counted number is used for identifying and selecting one of the defined property values.

For instance, such a count can be conducted as described below in connection with FIG. 15. Each remaining pixel 310, i.e. that is not regarded as a reference point, is assigned a start count value of zero. One is added for each diagonally neighboring pixel being a reference pixel 312, 314, 316, two is added for each vertically or horizontally neighboring pixel being a reference pixel 312, 314, 316, and finally one is added for each edge of the pixel block 300 neighboring the pixel 310 if any of its neighbors were reference points. These remaining pixels 310 therefore get count values from 0 to 6. The count value 7 is then reserved for the reference point pixels 312, 314, 316. The procedure is shown in FIG. 15. For instance, the pixel at position (0, 2) in the pixel block gets one point for having a diagonal neighbor (at position (1, 1)) that is a reference point, and another point for also being an edge pixel, for a total count value of two. The pixel block to the right in the figure illustrates the resulting count values obtained when applying this embodiment to the example positions of the reference pixels in FIG. 15.

FIG. 16 assigns the predefined value 7 to the two reference pixels 312, 314. The remaining pixels 310 get any of the values 0 to 6 depending on their respective shortest distance to a reference point on the interconnecting line. The result from such an embodiment is shown in the pixel block to the right in the figure.

In FIG. 17, the reference codeword 410 comprises the coordinate of a single pixel 312 in the pixel block 300 and optionally of the radius of a circle centered at the pixel coordinate. In this case, count values in the pixel block 300 would be calculated as a function of the distance from the center of a pixel 310 to the center of the circle as well as to the circle radius. It is easy to imagine other similar representations, such as an ellipse, where parameters in the reference codeword 410 define a shape, and the count values of the pixels 310 are calculated based on their distance to this shape.

The count values generated are used as pixel indices for selecting one of the property values available for the pixel block. Thus, if the property value set comprises eight available property values, the count values 0-7 are used for identifying one of the eight possible property values. It is apparent to the skilled person that the particular method of assigning pixel indices of the pixels based on their relative positions in the pixel block can use different intervals of pixel index values, depending on the number of available property values in the property value set.

FIG. 20 is a schematic illustration of an embodiment of a compressed pixel block 400. The compressed pixel block 400 comprises the reference codeword 410, represented with the x,y coordinates of the two reference pixels or points. The set codeword 420 comprises, in this embodiment, a base codeword 422 and a modifier codeword 424. The actual order of the included codewords 410, 420 may differ from the embodiment illustrated above.

Other embodiments may replace or omit one of the codewords 410, 420 in the compressed pixel block 400 in FIG. 20. For instance, in some embodiments the property value set is fixed and can therefore be hard coded at both the compressor and decompressor. In such a case, the base codeword 422 and modifier codeword 424 can be omitted. Alternatively, the compressor and decompressor have access to a limited number of different property value sets. In such a case, the set codeword 420 is used as a set index to one of these property value sets.

Furthermore, the reference codeword 410 could include only a single coordinate, a single coordinate and a radius or more than two coordinates.

Decompression Example

In this example a pixel block of 4×4 pixels has been assumed. Furthermore, the compressed pixel block comprises 16 bits. When decoding the 16 bits of a pixel block compressed in this example, the first step is to read the base codeword and the modifier codeword. The base codeword is a four-bit integer which is expanded into a base property value of eight bits by re-using the same four-bit sequence as the four highest and four lowest of the eight bits.

The modifier codeword is used to fetch an entry from the codebook or table of modifier sets shown in FIG. 18. The eight value modifiers in the fetched modifier set are then added to the 8-bit base property value, and the results are clamped to the interval [0,255]. We now have a property value set consisting of the eight possible pixel property values that will be used in the decoded block.

For example, a base codeword of $0111_{bin}$ (7) and modifier codeword of $0101_{bin}$ (5) will produce the eight-bit base property value $01110111_{bin}$ (119) and the value modifiers [−58, 3, −46, −6, 1, 22, 45, 52]. When these are added, the resulting pixel property values for the block are, in order, [61, 122, 73, 113, 120, 141, 164, 171].

Once the eight pixel property values have been determined, or in parallel, their placements within the 4×4 block are determined using the two-bit values $(x_1, y_1)$ and $(x_2, y_2)$ of the reference codeword. The first two values mark the x- and y-coordinates of one reference pixel, and the second two values mark the coordinates of a second reference pixel. A line, one pixel wide, is drawn between the two pixels, and all pixels on the line receive the last pixel property value for the block, 171 in the previous example.

Once the line has been drawn, a count is made for each of the remaining pixels as previously described.

With this method, results will be very similar if the positions of the first and second given pixels are swapped. This is exploited in a particular embodiment, by reversing the order of the pixel property values in the property value set if the first reference pixel lies after the second reference pixel assuming a fixed ordering of the 16 pixels in the block, such as using left-to-right, top-to-bottom.

The described decompression procedure is typically to be done on the GPU, in real time, as the texture is being accessed.

A simple variation of the described method is to not have any explicitly marked line pixels, instead relying on an implicitly defined line from the center of the first reference pixel to the center of the second reference pixel. All pixels in the pixel block are then treated exactly the same and are given pixel indices based only on a function of the distance from their center to the closest point on the defined line as in FIG. 16. Although requiring somewhat more complicated computations, this approach has the advantage of being more parallelizable, allowing separate decoding of the indices for each pixel in the pixel block.

Additionally, the property value set could be selected differently. For example, the two base property values can be defined as in FIG. 19. The values in-between the base property values are then interpolated. Tests indicate that this method results in worse compression than using a table with multiple value modifiers, but it has the advantage of not requiring a table of modifier sets to be stored on-chip.

Compression

Figure 5:
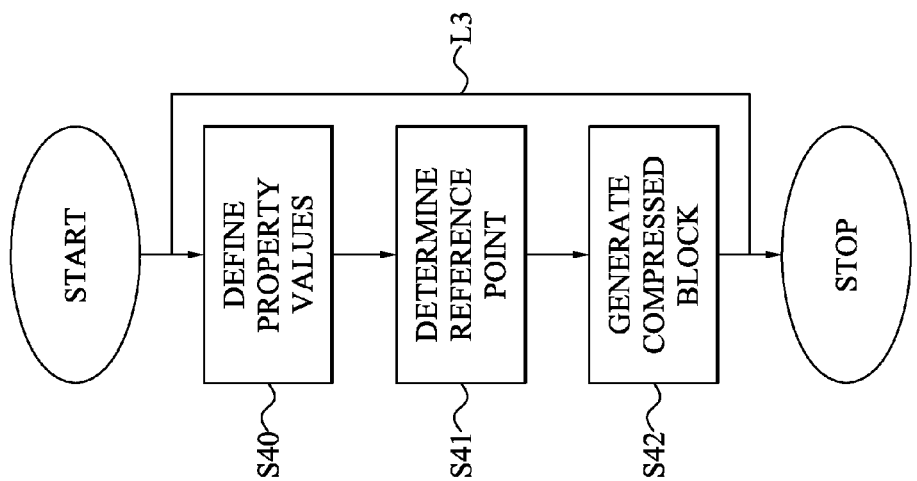
FIG. 5 is a flow diagram illustrating a method of compressing a pixel block according to an embodiment.

FIG. 5 is a flow diagram illustrating a method for compressing a pixel block of multiple pixels, where each pixel has a respective property value. The method starts in step S40, where multiple property values are defined as representations of the original property values in the pixel block. This value defining step is preferably performed based on at least a portion of the property values in the pixel block and more preferably based on all the property values in the pixel block.

The defining step S40 can be performed according to different embodiments as discussed in connection with step S1 of FIG. 1. For instance, a property value set of multiple predefined property values can be provided in step S40. In such a case, this predefined property value set can be provided without regard to the original property values in the pixel block. In an alternative approach, step S40 involves selecting a property value set of multiple property values from a table comprising multiple such predefined property value sets. The selection is then preferably performed based on the pixel property values in the pixel block. Another possibility is to define, possibly based on the property values in the pixel block, a value interval or range, enclosing allowable property values. Yet another embodiment, determines, based on the property values in the pixel block, a first pixel property value and a second pixel property value. In a typical implementation, the first value is selected to be based on or equal to the smallest property value in the pixel block, while the second value is based on or equal to the largest property value in the pixel block. At least one further property value is defined in step S40 as weighted combination of these two pixel property values to get the property value set. A further embodiment of step S40 is discussed in more detail with reference to FIG. 6.

The next step S41 determines at least one reference point relative the pixel block based on at least a portion of the pixel property values in the pixel block. This at least one reference point is used, during decompression, for calculating count value for pixels in the pixel block based on the respective positions of the pixels in the pixel block relative the reference point or points.

The operation of the two steps S40, S41 may be run in series but is typically performed in parallel together in order to define the most appropriate property values and reference points for the current pixel block.

The next step S42 generates a compressed representation of the pixel block based on a representation of the at least one reference point determined in step S41 and preferably a set codeword used as representation of the defined property values from step S40.

Steps S40 to S42 are preferably repeated for all pixel blocks to be compressed of a texture as is schematically illustrated by line L3. The result is then a sequence or file of compressed pixel blocks. The method then ends.

The encoded texture could be provided to a memory for storage therein until a subsequent rendering, e.g. display, of the texture. Furthermore, the encoded texture could be provided as a signal of encoded pixel blocks to a transmitter for wireless or wired transmission to another unit.

In clear contrast to texture decompression, compression can be done off-line before the texture is used, and can therefore be much more complex and time-consuming. In an embodiment, an exhaustive search among all possible property value sets and reference points is therefore performed. For instance, given a particular property value set, there are 256 different distributions of pixel indices from count values for a 4×4 pixel block. Furthermore, if the property value set is determined using a 4-bit base codeword and a modifier set selected from a table with 16 different modifier sets, there are 256 different possible property value sets. This leads in total to 65 536 different combinations for the pixel block. Thus, an exhaustive search among all these combination is indeed feasible when performing the compression offline. In such a case, these 65 536 possible candidate pixel blocks can be precomputed. Subsequently, when a pixel block is to be compressed, we compare it to the list of candidate pixel blocks, and select the one with the smallest mean-square error as the compressed representation of the pixel block.

This procedure may be more computationally effective by first rejecting certain candidate pixel blocks to thereby limit the search to a sub-set of the 65 536 candidate pixel blocks. In such a case, the average pixel property value is preferably precomputed for each of the 65 536 candidate pixel blocks. During compression, the average property value of the pixels in the pixel block to be compressed is calculated. The search is then limited using this calculated average value by rejecting those candidate pixel blocks that have respective precomputed average values differing significantly, i.e. by more than a defined threshold value, from the calculated average value.

Figure 6:
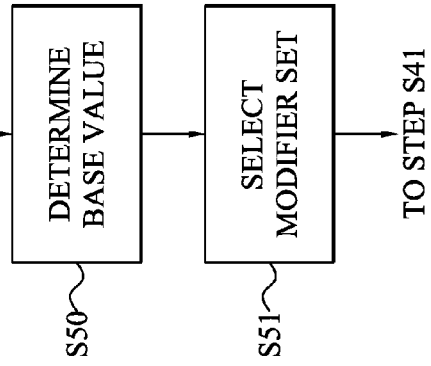
FIG. 6 is a flow diagram illustrating an embodiment of the value defining step of the compression method in FIG. 5.

FIG. 6 is a flow diagram illustrating an embodiment of the property value defining step of FIG. 5. The method starts in step S50. This step S50 determines a base property value based on at least a portion of the pixel property values in the pixel block. A next step S51 selects a modifier set of multiple value modifiers, preferably from a table or codebook comprising multiple such different modifier sets. These value modifiers are used, during decompression, for modifying the base property value to get the property value set of multiple pixel property values. The method then continues to step S41 of FIG. 5.

In this embodiment, the compressed representation of the pixel block comprises a representation of the base property value, i.e. the base codeword, and a representation of the modifier set, i.e. the modifier codeword.

If the property value set is instead defined as illustrated in FIG. 19, the compressed block preferably comprises the set codeword as a representation of the two pixel property values used for interpolating remaining values of the property value set.

Figure 7:
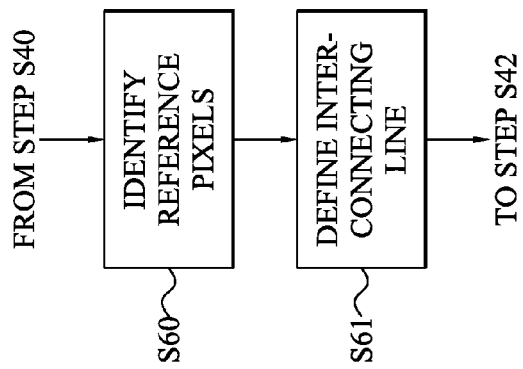
FIG. 7 is a flow diagram illustrating an embodiment of the point determining step of the compression method in FIG. 5.

FIG. 7 is a flow diagram illustrating optional additional steps of the compressing method. The method continues from step S40 of FIG. 5. A next step S60 identifies a first reference pixel in the pixel block and a corresponding second reference pixel. Step S61 defines a line between these two reference pixels. In such a case, the reference points determined in step S41 of FIG. 5 are determined as the positions of the first and second reference pixels and any intermediate pixel in the pixel block lying on the defined line.

During the compression, the property value set and the reference points minimizing, or some form of sub-optimizing, the error in representing the original pixel block with a pixel block obtained from the property value set and the distribution of pixel indices from count values as defined by the reference points are determined.

Decompressor

FIG. 8 is a schematic illustration of decompressor or decoder 200 according to an embodiment. The decompressor 200 comprises a value definer 210 for defining multiple pixel property values, preferably a property value set of multiple property values. These multiple property values are preferably defined based on information included in the compressed pixel block, such as the previously described set codeword.

A reference identifier 220 is used for identifying at least one reference point relative the pixel block based on a reference codeword included in the compressed pixel block.

The decompressor 200 also comprises a value selector 230 selecting, for each pixel to be decompressed in the pixel block, a pixel property value from the multiple property values defined by the value definer 210. Furthermore, the value selector 230 performs this value selection based on the position of the pixel in the pixel block relative the at least one reference point provided by the reference identifier 220. The selected property value is then assigned by a value assigner 240 to the pixel and is used as decompressed representation of the original pixel property value of the pixel.

The units 210 to 240 of the decompressor 200 may be provided as software, hardware or a combination thereof. In particular for software implementation, the decompressor 200 may be arranged on a GPU of a texture processing terminal, such as computer, laptop, mobile telephone or another mobile processing unit, a game console, etc.

FIG. 9 is a schematic block diagram of an embodiment of the value definer 210. In this case, the compressed pixel block comprises a set codeword in turn including a base codeword and a modifier codeword. A value provider 212 provides a base property value for the current pixel block to be decompressed based on the base codeword. This provision is preferably performed by dequantizing the base codeword into the base property value.

A modifier provider 214 of the value definer 210 provides a modifier set of multiple value modifiers based on the modifier codeword. The provider 214 preferably provides this modifier set from a table comprising multiple modifier sets. A value calculator 216 modifies the base property value from the value provider 212 with the value modifiers from the modifier provider 214 in order to get the property value set.

The units 212 to 216 of the value definer 210 may be provided as software, hardware or a combination thereof. The units 212 to 216 may be implemented together in the value definer 210. Alternatively, a distributed implementation is also possible with some of the units provided elsewhere in the decompressor.

Figure 10:
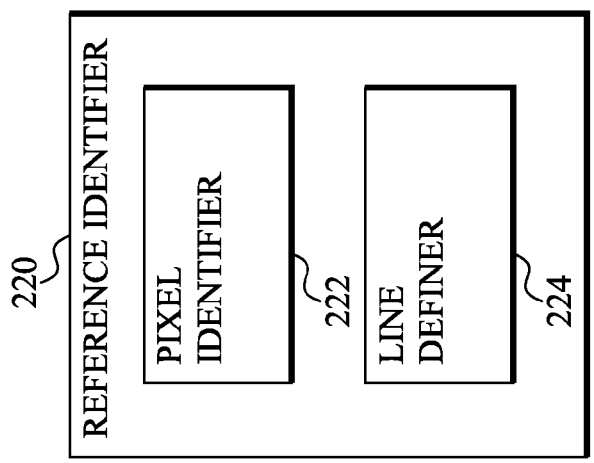
FIG. 10 is a schematic block diagram of an embodiment of the reference identifier in the decompressor of FIG. 8.

FIG. 10 is a schematic block diagram of an embodiment of the reference identifier 220 in the decompressor. The identifier 220 comprises a pixel identifier 222 for identifying first and second reference pixels in the pixel block based on the reference codeword. A line definer 224 then, virtually, defines a line in the pixel block extending between these reference pixels. The reference points are then defined as the two reference pixels and any intermediate pixel in the block lying on the line.

The units 222 and 224 of the reference identifier 220 may be provided as software, hardware or a combination thereof. The units 222 and 224 may be implemented together in the reference identifier 220. Alternatively, a distributed implementation is also possible with some of the units provided elsewhere in the decompressor.

Figure 11:
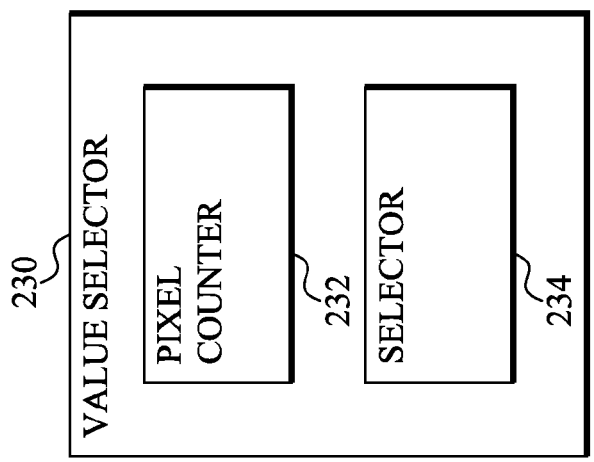
FIG. 11 is a schematic block diagram of an embodiment of the value selector in the decompressor of FIG. 8.

FIG. 11 is a schematic block diagram of an embodiment of the value selector 230 of the decompressor. The selector 230 comprises a pixel counter 232 for counting a number of neighboring pixels in the pixel block that are deemed to be reference points and that are, e.g. diagonally, vertically or horizontally, adjacent a current pixel. This count number or count value is used for determining a pixel index for the pixel, which is used by a selector 234 for selecting one of the pixel property values available for the pixel block.

The units 232 and 234 of the value selector 230 may be provided as software, hardware or a combination thereof. The units 232 and 234 may be implemented together in the value selector 230. Alternatively, a distributed implementation is also possible with some of the units provided elsewhere in the decompressor.

Compressor

Figure 12:
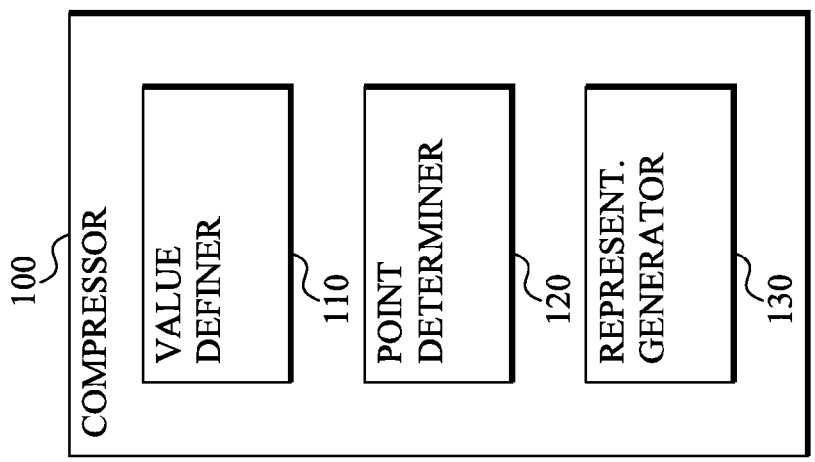
FIG. 12 is a schematic block diagram of a compressor according to an embodiment.

FIG. 12 is a schematic block diagram of an embodiment of a compressor or encoder 100. The compressor 100 comprises a value definer 110 for defining multiple pixel property values that are available for the current pixel block. A point determiner 120 determines at least one reference point relative the pixel block based on at least a portion of the pixel property values of the pixels in the current pixel block to be compressed. A compressed representation of the pixel block is generated by a representation generator 130 based on a representation of the at least one reference point and preferably based on a representation of the defined multiple property values.

The units 110 to 130 of the compressor 100 may be provided as software, hardware or a combination thereof. The compressor 100 may be arranged on a CPU of a texture processing terminal, such as computer, laptop, mobile telephone and other mobile processing units, a game console, etc.

FIG. 13 is a schematic block diagram of an embodiment of the value definer 110. The definer 110 comprises a value determiner for determining a base property value based on at least a portion of the pixel property values in the pixel block. A modifier set selector 114 selects a modifier set with multiple value modifiers based on the pixel property values in the pixel block. This modifier set is preferably selected from a table comprising multiple such modifier sets.

In such a case, the compressed pixel block comprises a base codeword as representation of the base property value and a modifier codeword as representation of the modifier set.

The units 112 and 114 of the value definer 110 may be provided as software, hardware or a combination thereof. The units 112 and 114 may be implemented together in the value definer 110. Alternatively, a distributed implementation is also possible with some of the units provided elsewhere in the compressor.

FIG. 14 is a schematic block diagram illustrating an embodiment of the point determiner 120 of the compressor. A pixel identifier 122 identifies first and second reference pixels among the multiple pixels in the pixel block. The identifier 122 preferably performs this selection based on at least some of the original property values in the pixel block.

A determiner 124 determines the reference points as the positions of the two reference pixels and any intermediate pixel in the block lying on a line interconnecting the two reference pixels.

The units 122 and 124 of the point determiner 120 may be provided as software, hardware or a combination thereof. The units 122 and 124 may be implemented together in the point determiner 120. Alternatively, a distributed implementation is also possible with some of the units provided elsewhere in the compressor.

The present scheme has the advantage over DXTC [1] that the alpha channel requires fewer bits, which can be exploited to improve visual quality in other areas or to improve the performance and energy consumption of the system.

The more efficient compression of the alpha channel can lead to a reduction in quality for the alpha channel. The important question here is whether the reduction in quality that comes with this reduction in size is acceptable. This has been tested by compressing alpha channels used for different purposes in the 2006 computer game Oblivion by Bethesda Softworks.

For this particular application, it appears that the large degradation in image quality in the alpha channel is barely noticeable in the final rendered image produced from it, and it is suspected that this might be the case for many other applications as well.

In order to investigate whether the compression performed according to the embodiments is indeed a meaningful compression and not simply a random removal of information a comparative test was conducted. In this test, the PSNR scores achieved with the present scheme were compared to those one can easily achieve by downscaling the image to half the size in both the x- and y-dimensions, compressing it to four bits per pixel using DXTC, and then performing upscaling to the original resolution after decompression.

Testing has shown that the present scheme achieves better PSNR scores by about 2 to 3 dB on average over a series of test images, indicating that it is indeed a useful scheme for compression.

It will be understood by a person skilled in the art that various modifications and changes may be made to the present invention without departure from the scope thereof, which is defined by the appended claims.

REFERENCES

[1] U.S. Pat. No. 5,956,431

The invention claimed is:

1. A method implemented by a decompressor comprising one or more circuits for decompressing a compressed pixel block, said method comprising:

defining multiple pixel property values at the decompressor;

identifying, by the decompressor and based on a reference codeword comprised in said compressed pixel block, one or more reference points relative to a pixel block;

selecting, by the decompressor and for at least one pixel in said pixel block, a pixel property value from said multiple pixel property values based on a position of said at least one pixel in said pixel block relative to at least one of said reference points; and assigning, by the decompressor and to said at least one pixel, said selected pixel property value as a decompressed representation of an original pixel property value of said at least one pixel.

2. The method according to claim 1, wherein said defining comprises determining a property value set that includes said multiple pixel property values, based on a set codeword comprised in said compressed pixel block.

3. The method according to claim 2, wherein said set codeword comprises a base codeword and a modifier codeword, and wherein said defining comprises:

determining a base property value based on said base codeword;

determining a modifier set that includes multiple value modifiers, based on said modifier codeword; and calculating said property value set based on said base property value and said modifier set.

4. The method according to claim 1, wherein said identifying comprises:

identifying a first reference pixel in said pixel block and a second reference pixel in said pixel block based on said reference codeword; and defining a line in said pixel block extending from said first reference pixel to said second reference pixel, wherein positions of said first reference pixel, said second reference pixel, and any intermediate pixels in said pixel block lying on said line constitute said one or more reference points.

5. The method according to claim 4, wherein said selecting comprises:

counting the number of neighboring pixels adjacent said at least one pixel in said pixel block that are reference points; and selecting said pixel property value from said multiple pixel property values based on said counted number of neighboring pixels.

6. A decompressor for decompressing a compressed pixel block, said decompressor comprising:

a value definer circuit configured to define multiple pixel property values;

a reference point identifier circuit configured to identify, based on a reference codeword comprised in said compressed pixel block, one or more reference points relative to a pixel block;

a value selector circuit configured to select, for at least one pixel in said pixel block, a pixel property value from said multiple pixel property values based on a position of said at least one pixel in said pixel block relative to at least one of said reference points; and a value assigner circuit configured to assign, to said at least one pixel, said selected pixel property value as a decompressed representation of an original pixel property value of said at least one pixel.

7. The decompressor according to claim 6, wherein said value definer circuit is configured to determine a property value set that includes said multiple pixel property values, based on a set codeword comprised in said compressed pixel block.

8. The decompressor according to claim 7, wherein said set codeword comprises a base codeword and a modifier codeword, and wherein said value definer circuit comprises:
    a value provider circuit configured to determine a base property value based on said base codeword;
    a modifier provider circuit configured to determine a modifier set that includes multiple value modifiers, based on said modifier codeword; and
    a value calculator circuit configured to calculate said property value set based on said base property value and said modifier set.

9. The decompressor according to claim 6, wherein said reference point identifier circuit comprises:
    a pixel identifier circuit configured to identify a first reference pixel in said pixel block and a second reference pixel in said pixel block based on said reference codeword; and
    a line definer circuit configured to define a line in said pixel block extending from said first reference pixel to said second reference pixel, wherein positions of said first reference pixel, said second reference pixel, and any intermediate pixels in said pixel block lying on said line constitute said one or more reference points.

10. The decompressor according to claim 9, wherein said value selector circuit comprises:
    a pixel counter circuit configured to count the number of neighboring pixels adjacent said at least one pixel in said pixel block that are reference points; and
    a selector circuit configured to select said pixel property value from said multiple pixel property values based on said number of neighboring pixels counted by said pixel counter circuit.

11. A method implemented by a compressor comprising one or more circuits for compressing a pixel block that includes multiple pixels, each pixel having a respective pixel property value, said method comprising:
    defining multiple pixel property values at the compressor;
    determining, by the compressor, one or more reference points relative said pixel block based on at least a portion of said pixel property values, wherein a position of a pixel in said pixel block, relative said one one or more reference points, defines an identifier of a pixel property value for that pixel, out of said defined multiple pixel property values; and
    generating, by the compressor, a compressed representation of said pixel block based on a representation of said one or more reference points.

12. The method according to claim 11, wherein said defining comprises:
    determining a base property value based on at least a portion of said pixel property values; and
    selecting, based on said at least a portion of said pixel property values, a modifier set that includes multiple value modifiers, said modifier set applicable to said base property value to produce a property value set that includes multiple pixel property values,
    wherein said generating comprises generating said compressed representation of said pixel block further based on a representation of said base property value and a representation of said modifier set.

13. The method according to claim 11, wherein said determining comprises:
    identifying a first reference pixel in said pixel block and a second reference pixel in said pixel block based on said at least a portion of said pixel property values; and
    determining said one or more reference points as positions of said identified first reference pixel, said second reference pixel, and any intermediate pixel in said pixel block lying on a line extending from said first reference pixel to said second reference pixel.

14. A compressor for compressing a pixel block that includes multiple pixels, each pixel having a respective pixel property value, said compressor comprising:
    a value definer circuit configured to define multiple pixel property values;
    a point determiner circuit configured to determine one or more reference points relative said pixel block based on at least a portion of said pixel property values, wherein a position of a pixel in said pixel block, relative said one or more reference points, defines an identifier of a pixel property value for that pixel, out of said multiple pixel property values; and
    a representation generator circuit configured to generate a compressed representation of said pixel block based on a representation of said one or more reference points.

15. The compressor according to claim 14, wherein said value definer circuit comprises:
    a value determiner circuit configured to determine a base property value based on at least a portion of said pixel property values; and
    a modifier set selector circuit configured to select, based on said at least a portion of said pixel property values, a modifier set that includes multiple value modifiers, said modified set applicable to said base property value to produce a property value set that includes multiple pixel property values,
    wherein said representation generator circuit is configured to generate said compressed representation of said pixel block further based on a representation of said base property value and a representation of said modifier set.

16. The compressor according to claim 14, wherein said point determiner circuit comprises:
    a pixel identifier circuit configured to identify a first reference pixel in said pixel block and a second reference pixel in said pixel block based on said at least a portion of said pixel property values; and
    a determiner circuit configured to determine said one or more reference points as positions of said first reference pixel, said second reference pixel, and any intermediate pixel in said pixel block lying on a line extending from said first reference pixel to said second reference pixel.

* * * * *

UNITED STATES PATENT AND TRADEMARK OFFICE
CERTIFICATE OF CORRECTION

PATENT NO. : 8,582,902 B2  
APPLICATION NO. : 13/120336  
DATED : November 12, 2013  
INVENTOR(S) : Ström et al.

Page 1 of 1

It is certified that error appears in the above-identified patent and that said Letters Patent is hereby corrected as shown below:

On the Title Page, Item (12), under "United States Patent", in Column 1, line 1, delete "Strom" and insert -- Ström --, therefor.

On the Title page, Item (75), under "Inventors", in Column 1, Line 1, delete "Strom," and insert -- Ström, --, therefor.

In the Claims

In Column 17, Line 45, in Claim 11, delete "one one or" an insert -- one or --, therefor.

Signed and Sealed this  
Fifteenth Day of July, 2014

Michelle K. Lee  
*Deputy Director of the United States Patent and Trademark Office*